United States Patent
Kim et al.

(10) Patent No.: US 8,599,265 B2
(45) Date of Patent: Dec. 3, 2013

(54) POWER CONTROL METHOD OF DEVICE CONTROLLABLE BY USER'S GESTURE

(75) Inventors: Sungun Kim, Seoul (KR); Soungmin Im, Seoul (KR)

(73) Assignee: LG Electronics Inc., Seoul (KR)

( * ) Notice: Subject to any disclaimer, the term of this patent is extended or adjusted under 35 U.S.C. 154(b) by 215 days.

(21) Appl. No.: 12/958,760

(22) Filed: Dec. 2, 2010

(65) Prior Publication Data

US 2011/0134250 A1 Jun. 9, 2011

(30) Foreign Application Priority Data

Dec. 3, 2009 (KR) .................. 10-2009-0119215

(51) Int. Cl.
 *H04N 5/33* (2006.01)

(52) U.S. Cl.
 USPC ........ 348/164; 348/69; 348/372; 348/208.16; 348/333.13; 713/300

(58) Field of Classification Search
 None
 See application file for complete search history.

(56) References Cited

U.S. PATENT DOCUMENTS

| | | | |
|---|---|---|---|
| 2003/0132950 A1* | 7/2003 | Surucu et al. | 345/700 |
| 2005/0104968 A1* | 5/2005 | Aoki et al. | 348/207.99 |
| 2007/0192910 A1* | 8/2007 | Vu et al. | 901/17 |
| 2008/0122803 A1* | 5/2008 | Izadi et al. | 345/175 |
| 2009/0082066 A1 | 3/2009 | Katz | |
| 2011/0134251 A1* | 6/2011 | Kim et al. | 348/164 |

FOREIGN PATENT DOCUMENTS

| | | |
|---|---|---|
| JP | 2006-222529 A | 8/2006 |
| KR | 10-2006-0012375 A | 2/2006 |
| KR | 10-2007-0116714 A | 12/2007 |

* cited by examiner

*Primary Examiner* — Sath V Perungavoor
*Assistant Examiner* — Dakshesh Parikh
(74) *Attorney, Agent, or Firm* — Birch, Stewart, Kolasch & Birch, LLP

(57) ABSTRACT

Provided is a method which minimizes power consumption by controlling power of a camera that is used for recognizing a user's gesture, in a video processing apparatus, which recognizes the user's gesture and is controlled according to the recognized gesture, such as a TV or a monitor. In the present invention, a camera is driven in a low power mode or a high power mode, and when a user's specific gesture is detected in the lower power mode, the camera is switched to the high power mode for recognizing a detailed gesture.

17 Claims, 9 Drawing Sheets

POWER CONTROL METHOD OF DEVICE CONTROLLABLE BY USER'S GESTURE

CROSS-REFERENCE TO RELATED APPLICATIONS

The present application claims priority under 35 U.S.C. 119 and 35 U.S.C. 365 to Korean Patent Application No. 10-2009-0119215 filed on Dec. 3, 2009, which is hereby incorporated by reference in its entirety.

BACKGROUND

The present disclosure relates to a power control method of device controllable by user's gesture. More specifically, the present invention proposes a method which minimizes power consumption by controlling power of a camera that is used for recognizing a user's gesture, in a video processing apparatus, which recognizes the user's gesture and is controlled according to the recognized gesture, such as a television (TV) or a monitor. In the present invention, a camera is driven in a low power mode or a high power mode, and when a user's specific gesture is detected in the lower power mode, the camera is switched to the high power mode for recognizing a detailed gesture.

Recently, user input devices are being diversified, and moreover, provided are devices that recognize a user's gesture to receive a command.

Devices which recognize a user's gesture to receive a command use a motion sensor such as G sensor for recognizing the user's gesture, and capture an image with a camera to process the captured image.

In a method that captures an image with a camera to recognize a gesture, the camera is required to maintain a turn-on state for detecting a user's gesture. In devices that receive user inputs at lengthy intervals like televisions (TVs), however, a power is wasted when a camera is being turned on for a long time.

SUMMARY

Embodiments provide a method which allows a camera for recognizing a user's gesture to operate only when necessary.

Embodiments also provide a method which recognizes a user's gesture and intuitively controls the power mode of a camera for recognizing a gesture.

In one embodiment, provided is a method of controlling a user interface of a computing device by using a camera for gesture detection of a user. The method includes: detecting an active input which is designated to switch a first power mode of the camera to a second power mode; switching an operation mode of the camera to the second power mode according to the designated user input; detecting a user gesture in the second power mode; and controlling the computing device according to the detected gesture, wherein the camera detects more user gestures than the first power mode, in the second power mode.

In another embodiment, provided is a user input detecting method in a computing device connected to a camera by using the camera for gesture detection of a user. The method includes: detecting an active gesture which is designated to switch a first power mode of the camera to a second power mode which enables detection of more user gestures than the first power mode; switching an operation mode of the camera to the second power mode according to the active gesture; detecting a user gesture in the second power mode; and transmitting a control command signal corresponding to the detected gesture to the computing device.

According to embodiments, a camera for recognizing a user's gesture operates only when necessary, thereby reducing power consumption.

According to embodiments, a user's gesture is recognized and the power mode of a camera for recognizing a gesture is intuitively controlled.

It is to be understood that both the foregoing general description and the following detailed description of the present invention are exemplary and explanatory and are intended to provide further explanation of the invention as claimed. The details of one or more embodiments are set forth in the accompanying drawings and the description below. Other features will be apparent from the description and drawings, and from the claims.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Hereinafter, embodiments will be described in more detail with reference to the accompanying drawings.

Figure 1:
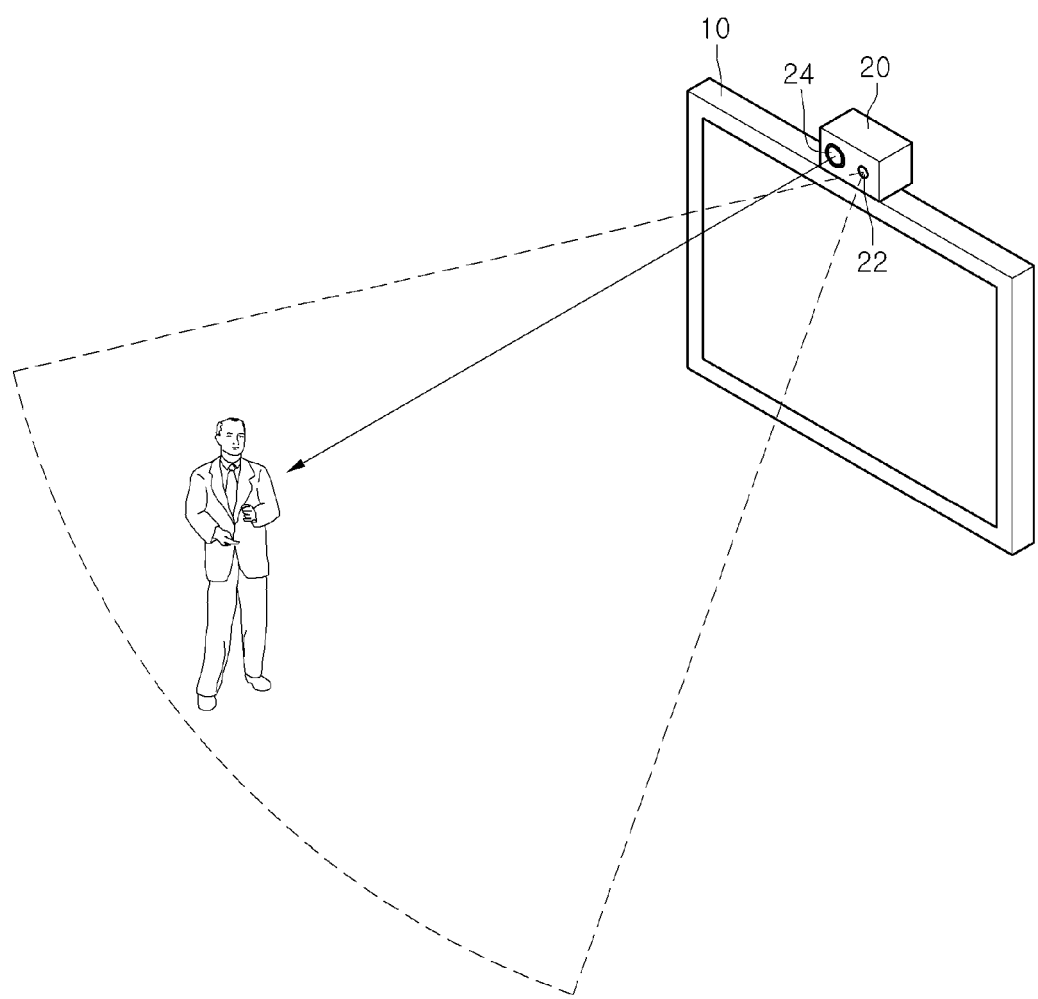
FIG. 1 is a diagram illustrating a method of recognizing a user's gesture according to an embodiment.

FIG. 1 is a diagram illustrating a method of recognizing a user's gesture according to an embodiment. In FIG. 1, a computing device 10 and a camera 20 connected to or mounted on the computing device 10 are illustrated.

As a processing device that performs an arbitrary function, the computing device 10 includes an arbitrary device that is controlled by a user's gesture. The computing device 10 may receive the user's gesture image from the camera 20 to detect the user's gesture, and perform an operation based on the gesture. The computing device 10 may be a device that includes a display like televisions (TVs), monitors and Personal Computers (PCs), or may be a device that does not include a display like set-top boxes, PC bodies and audio devices.

As a device that captures a user's gesture, the camera 20 may be mounted on and integrated with the computing device 10, or as an optionally independent device, the camera 20 may be connected to the computing device 10.

The camera 20 includes an image receiver 24 capturing an image, and an illuminator 22 providing illumination. According to embodiments, the illuminator 22 may be configured as a separate device. The camera 20 may be an infrared camera, the image receiver 24 may be an infrared CMOS sensor array, and the illuminator 22 may be an infrared illuminator.

As illustrated in FIG. 1, when the user is disposed within a certain distance and an angle range from the image receiver 24 and the illuminator 22, the image receiver 24 may capture the user's gesture. The captured gesture image is transferred to the computing device 10. The computing device 10 extracts and distinguishes a gesture pattern, and performs a corresponding command based on the distinguished gesture.

According to an embodiment, the camera 20 has a plurality of power modes. For example, the camera 20 may have a high power mode and a low power mode. In this case, the camera 20 operates in the low power mode when there is no user input, and when an active input enabling input in the low power mode is received from the user, the camera 20 switches the power mode to the high power mode enabling high performance recognition.

Figure 2:
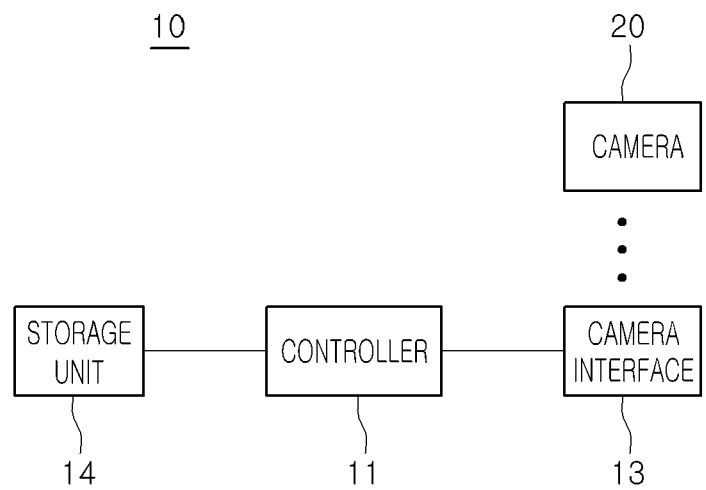
FIG. 2 is a block diagram illustrating a computing device according to an embodiment.

FIG. 2 is a block diagram illustrating the computing device 10 according to an embodiment.

Referring to FIG. 2, the computing device 10 according to an embodiment includes a camera interface 13, a storage unit 14, and a controller 11. Herein, the camera interface 13 is connected to the camera 20 and receives a user's gesture image from the camera 20. The storage unit 14 stores commands corresponding to gestures that are inputted by the user. The controller 11 may process the received gesture image, analyze the pattern of gesture to distinguish the gesture, and perform a command corresponding to the distinguished gesture.

According to an embodiment, the camera 20 may be integrated with the computing device 10, or may be attached/detached to/from the computing device 10. As a separate device, alternatively, the camera 20 may be connected to the computing device 10 in a wired way or a wireless way.

The camera interface 13 may be a connector, a wired communication module or a wireless communication module for connecting the camera 20 and the computing device 10. The camera interface 13 transfers an image captured by the camera 20 to the controller 11.

The storage unit 14 may be an arbitrary storage medium such as Read Only Memory (ROM), Electrical Erasable Programmable Read Only Memory (EEPROM), flash memory or Hard Disk Driver (HDD). The controller 11 stores commands corresponding to the user's gesture input in the storage unit 14.

The controller 11 may be a general processor or a dedicated processor, and may be configured in an arbitrary scheme such as Application Specific Integrated Circuit (ASIC) or Field Programmable Gate Array (FPGA).

Figure 3:
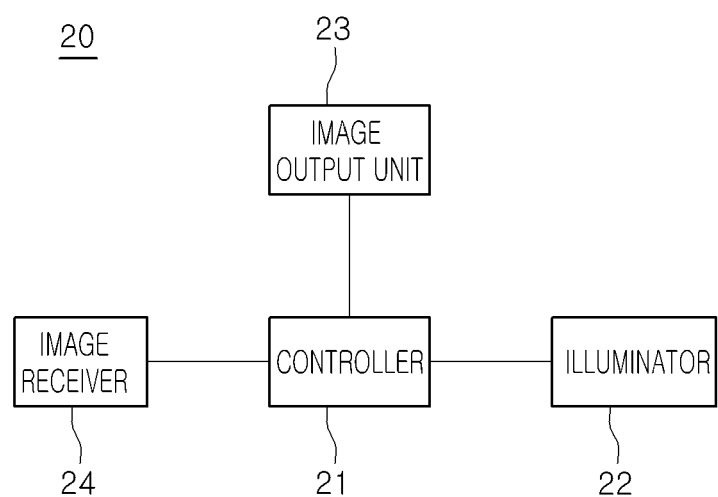
FIG. 3 is a block diagram illustrating a camera according to an embodiment.

FIG. 3 is a block diagram illustrating the camera 20 according to an embodiment.

Referring to FIG. 3, the camera 20 includes an image receiver 24, an illuminator 22, an image output unit 23, and a controller 21. Herein, the image receiver 24 captures a user's gesture image. The illuminator 22 provides illumination. The image output unit 23 converts an image captured by the image receiver 24 into a format capable of being processed by the computing device 10. The controller 21 controls the overall operation of the camera 20, and controls the power mode of the camera 20 according to the user's gesture input.

The camera 20 may be an infrared camera, and the image receiver 24 may be an infrared CMOS sensor array. The illuminator 22 may be an infrared light source.

When the camera 20 is integrated with the computing device 10, all or a portion of functions performed by the controller 21 of the camera 20 may be performed by the controller 11 of the computing device 10.

According to an embodiment, while the computing device 10 is turned on and there is no input from the user for a certain time, the camera 20 is driven in the low power mode for performing the image recognition of low performance, and the power mode is switched to the high power mode enabling high performance recognition when an active input receivable in the low power mode is received from the user. The active input may be the user's specific gesture, and may be a gesture detectable even in the low power mode.

Some user gestures may be detected in the low power mode, and the high power mode enables the detection of more user gestures than the low power mode. That is, a large and slow gesture may be detected in the low power mode, but a large and slow gesture and a small and fast gesture may be detected in the high power mode. Accordingly, the high power mode may be referred to as an operation mode that enables the detection of a plurality of sub-divided gestures.

The power mode of the camera 20 may be controlled by controlling the driving factors of the camera 20 or the driving factors of the illuminator 22. For example, the power mode of the camera 20 may be controlled by controlling the frame rate of the camera 20 or controlling a clock speed, a resolution, a shutter speed or the like. Also, the power mode of the camera 20 may be controlled by controlling the illumination intensity of the illuminator 22. That is, setting is made to provide illumination only to a distance relatively close from the computing device 10 in the low power mode, but setting is made to provide illumination even to a distance relatively far from the computing device 10 in the high power mode.

All or a portion of the driving factors are set to low values in the low power mode, and all or a portion of the driving factors are changed to relatively high values in the high power mode. Therefore, the power mode of the camera 20 may be changed. The power mode of the camera 20 may be controlled by changing the frame rate of the camera 20. The detailed values of the driving factors may vary according to the kinds of computing devices 10 or specific applications.

A power control method of a camera according to an embodiment will be described below in detail with reference to FIG. 4.

Figure 4:
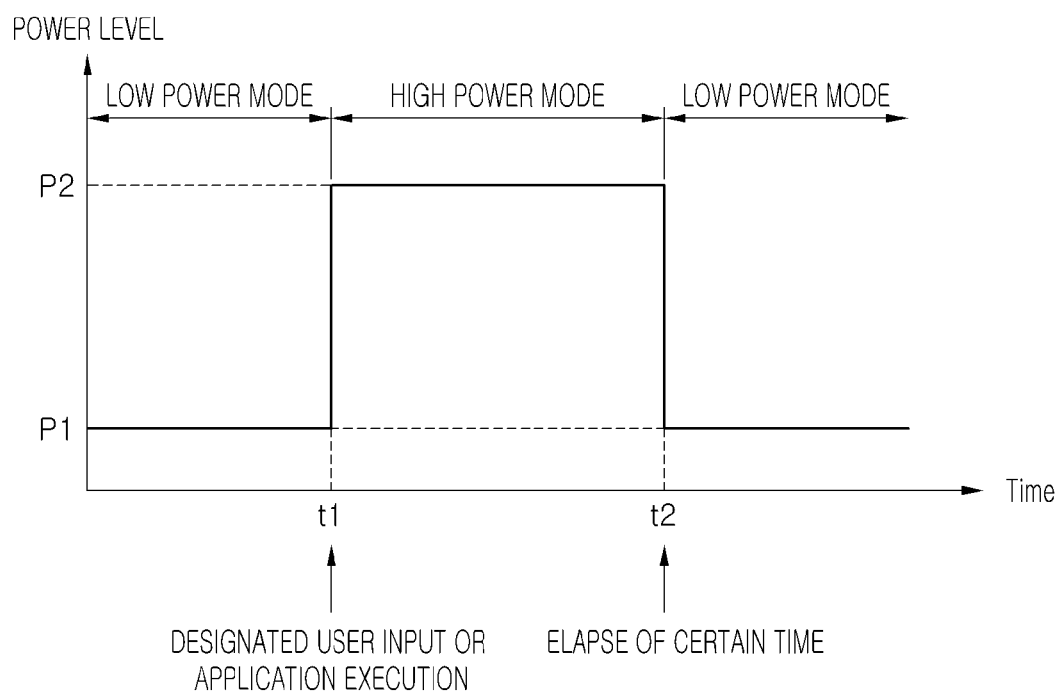
FIG. 4 is a diagram illustrating the power level change of a camera according to an embodiment.

In FIG. 4, when there is no input from a user for a certain time, the camera 20 is driven in a first power mode. The first power mode is a low power mode, in which case driving factors for controlling the power mode are set to low values.

It is assumed that a power level is P1 in the first power mode. A gesture detectable in the first power mode is a gesture detectable even in low performance, i.e., a relatively large and slow gesture. One of large gestures may be designated as a user's active gesture and stored in the storage unit 14.

At a time t1, when an active input (for example, an active gesture input) is inputted from the user, the camera 20 switches a power mode to a second power mode, i.e., a mode using a high power. In the second power mode, the driving factors for controlling the power mode are changed to high values.

It is assumed that a power level is P2 in the second power mode. In the second power mode, a smaller and faster gesture than the first power mode may also be detected, and all gestures set for controlling the computing device 10 may be detected. When there is no input from the user for a certain time after entering into the second power mode, the camera 20 again returns to the low power mode at a time t2.

For example, when the computing device 10 is a TV, a camera connected to the TV is in the first power mode while the user is viewing the TV. When the user intends to input a volume up command, the user first inputs an active gesture. The power mode of the camera may be switched to the second power mode by the active gesture, and the user may input a gesture corresponding to the volume up command. The user again views the TV, and when and there is no input for a certain time, the power mode of the camera again returns to the first power mode.

When an application requiring a user input is executed in the computing device 10 according to the user input or other conditions, the power mode of the camera may be automatically switched to the second power mode. In addition, when a user input is required, the power mode of the camera may be automatically switched to the second power mode. Also, even a gesture may be set for again returning from the second power mode to the first power mode.

Figure 5:
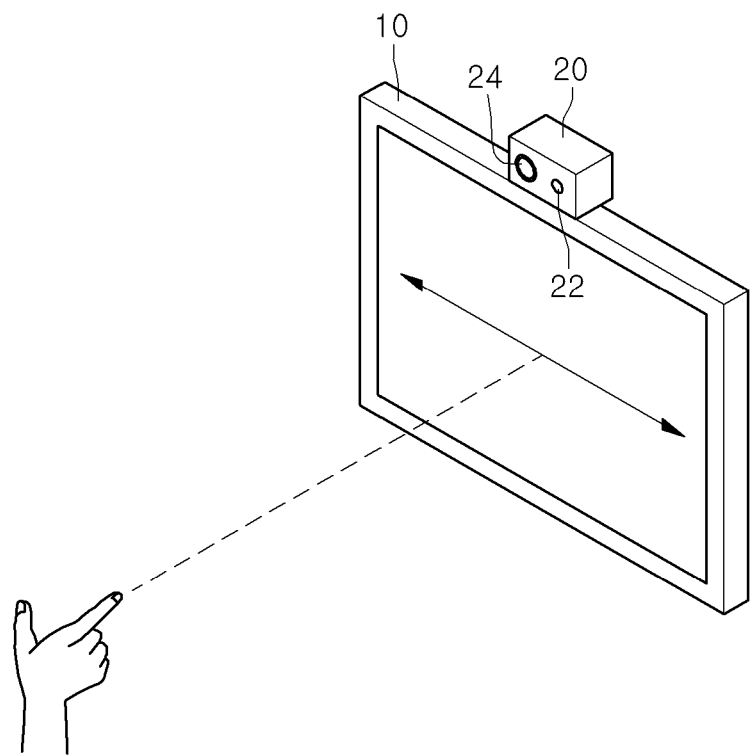
FIG. 5 is a diagram illustrating an active gesture for changing a power mode of a camera according to an embodiment.

FIG. 5 is a diagram illustrating an active gesture for changing a power mode of a camera according to an embodiment.

A gesture, where a user shakes a finger from side to side at a slow speed toward the computing device 10, may be set as an active gesture. The active gesture may be changed according to embodiments, and may be a gesture that is relatively large and slow, and enables the analysis of a pattern even with a low performance camera. In addition, the designated user input may be set as the shaking of the user's one hand from side to side or upward and downward, or the drawing of the user's one hand a specific polygon.

Figure 6:
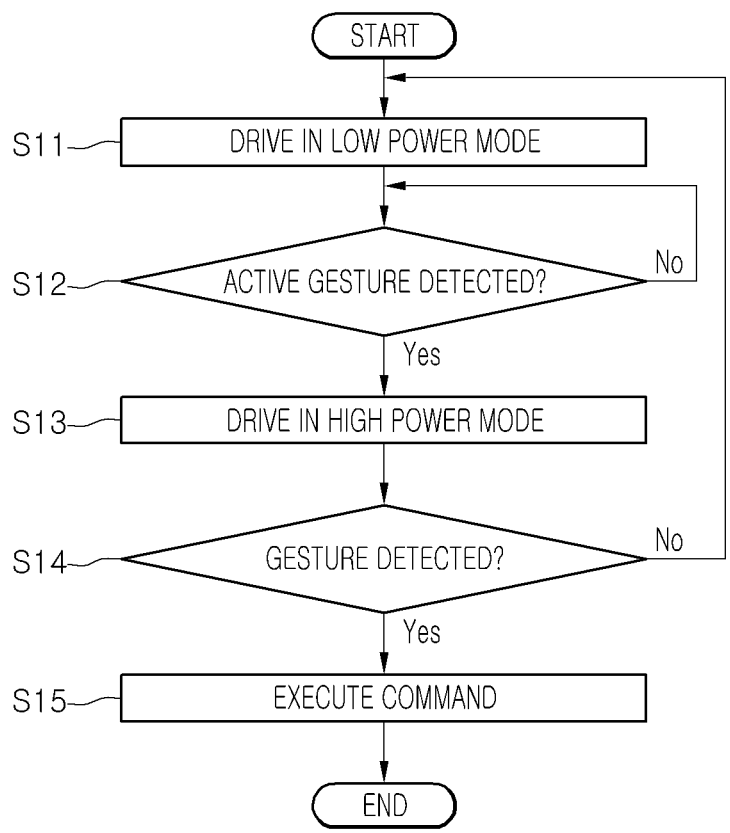
FIG. 6 is a flowchart illustrating a power control method of a camera according to an embodiment.

FIG. 6 is a flowchart illustrating a power control method of a camera according to an embodiment.

Referring to FIG. 6, a camera is driven in a first power mode, i.e., a low power mode in operation S11. When an active gesture such as the gesture of FIG. 5 is detected in operation S12, a power mode is switched to a second power mode, i.e., a high power mode in operation S13. When a user's gesture input is detected in operation S14, a command corresponding to the detected gesture is executed in operation S15.

When the active gesture is not detected in operation S12, the camera is continuously driven in the low power mode. When a user input is not detected for longer than a certain time in operation S14, the camera again returns to the low power mode in operation 511.

Figure 7:
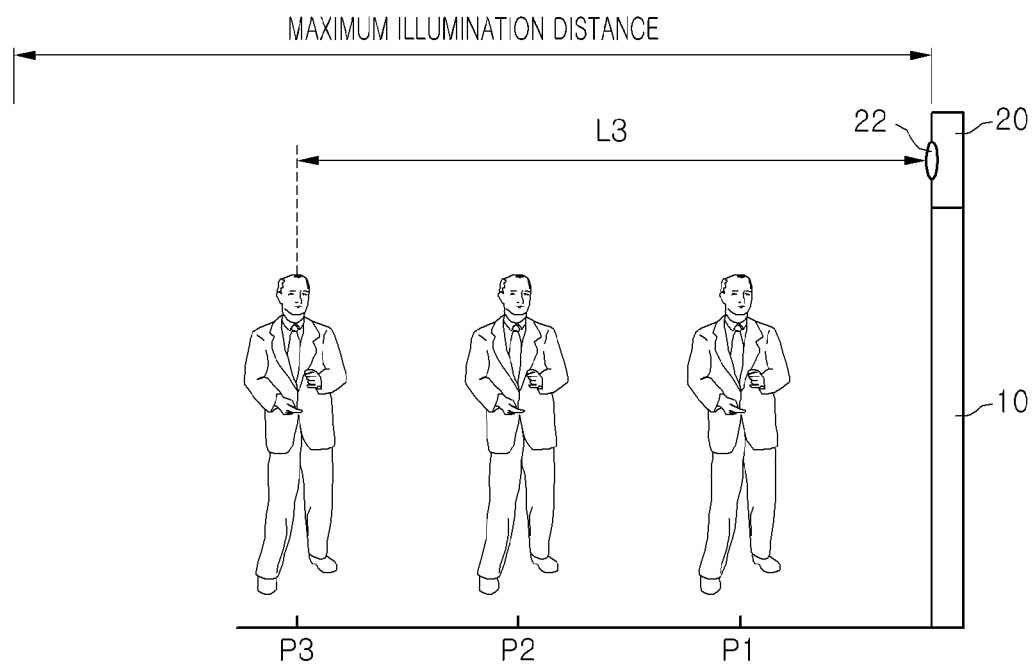
FIG. 7 is a diagram illustrating a method of controlling the range of an illuminator based on the recognizable range of a camera according to an embodiment.

FIG. 7 is a diagram illustrating a method of controlling the range of an illuminator based on the recognizable range of a camera according to an embodiment.

As described above, when the power mode of the camera 20 is controlled, the illumination distance of the illuminator 22 may be controlled. As the illumination distance of the illuminator 22 becomes farther away from the computing device 10, the power consumption of the camera 20 increases. As the illuminable distance of the illuminator 22 becomes closer to the computing device 10, the power consumption of the camera 20 decreases.

The illuminable distance of the illuminator 22 may be greater than a distance in which the image receiver 24 of the camera 20, for example, a CMOS sensor array may recognize an image. The illumination distance of the illuminator 22 is the same as a distance in which the image receiver 24 of the camera 20 may recognize an image.

Whenever a user inputs a gesture by the number of predetermined times or for a predetermined duration according to an embodiment, the camera 20 may measure and control a distance from the user to the computing device 10, and may set the illuminable distance of the illuminator 22 as the farthest distance of the measured distances. For example, whenever the user inputs gestures thirty times from different positions or inputs gestures for one month, the camera 20 may measure a distance from the user to the computing device 10. The distance from the user to the computing device 10 may be measured by the camera 20 when the user inputs a gesture.

Referring to FIG. 7, when P1, P2 and P3 are positions from which the user has successively inputted gesture commands, the position farthest away from the computing device 10 is P3, in which case a distance is L3. When the illuminable distance of the illuminator 22 is set as the distance L3, the distance L3 is the optimal illumination distance, and thus power consumption can be minimized.

Figure 8:
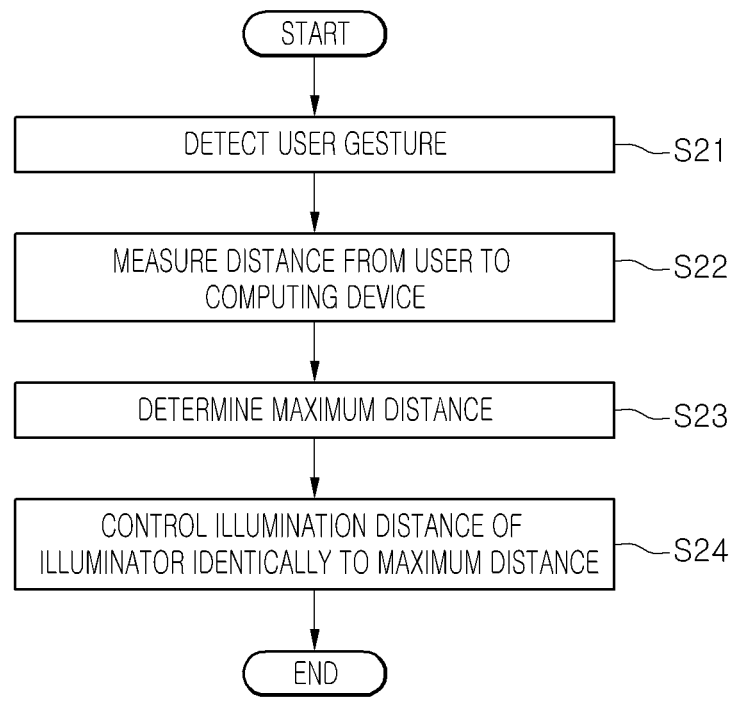
FIG. 8 is a flowchart illustrating a method of controlling the illumination range of an illuminator based on the recognizable range of a camera, according to an embodiment.

FIG. 8 is a flowchart illustrating a method of controlling the illumination range of an illuminator based on the recognizable range of a camera, according to an embodiment.

Referring to FIG. 8, the camera 20 detects a user's gesture by a certain number of times or for a certain time in operation S21. The camera 20 measures a distance from the user to the computing device 10 each time the user inputs a gesture in operation S22. The camera 20 determines the maximum distance of the measured distances in operation S23, and it controls the illumination distance of the illuminator 22 identically to the maximum distance in operation S24.

Figure 9:
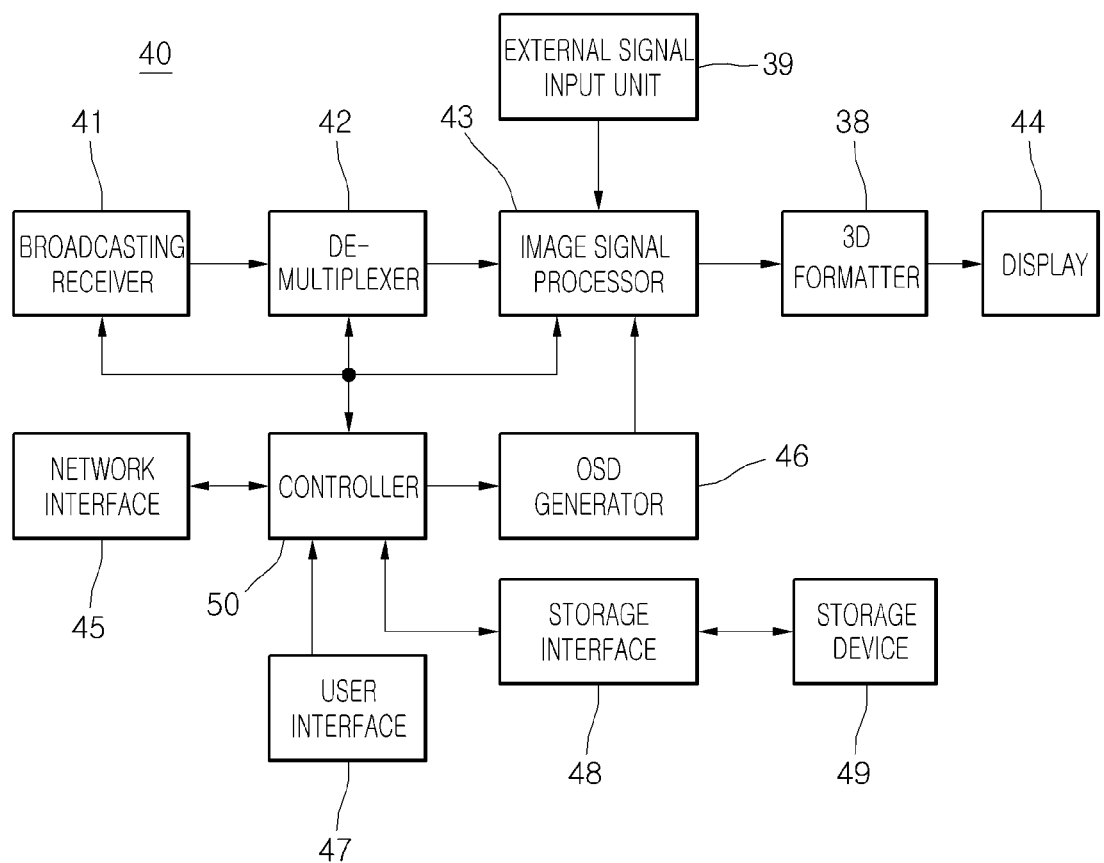
FIG. 9 is a block diagram illustrating a broadcasting reception apparatus for implementing a power control method of a camera for gesture recognition, according to an embodiment.

FIG. 9 is a block diagram illustrating a broadcasting reception apparatus for implementing a power control method of a camera for gesture recognition, according to an embodiment.

A broadcasting reception apparatus 40 according to an embodiment may have a function of receiving content over a network, and a function that receives a Radio Frequency (RF) signal type of broadcasting signal through a broadcasting receiver 41 by wireless/cable.

Referring to FIG. 9, the broadcasting reception apparatus 40 includes a broadcasting receiver 41, a de-multiplexer 42, an image signal processor 43, a display 44, a network interface 45, an On-Screen Display (OSD) generator 46, a user interface 47, a storage interface 48, a storage device 49, an external signal input unit 39, and a controller 50.

The controller 50, storage device 49 and external signal input unit 39 of the broadcasting reception apparatus 40 correspond to the controller 11, storage unit 14 and camera interface 13 of the computing device 10 of FIG. 1, respectively.

Among the elements, the broadcasting receiver 41, the de-multiplexer 42 and the image signal processor 43 may configure one broadcasting processor that receives a broadcasting signal and processes the broadcasting signal into a type outputtable by the display 44 through various processing.

When content is digital broadcasting, a digital broadcasting signal is transmitted as a transport stream type that is packetized by time-division multiplexing an audio signal, a video signal and additional data.

The broadcasting receiver 41 may include an antenna that receives a broadcasting signal transmitted from the outside. Also, the broadcasting receiver 41 may include a tuner and a demodulator. Herein, the tuner tunes a broadcasting signal having a corresponding frequency band according to the tuning control signal of the controller 50. The demodulator outputs the tuned broadcasting signal of a specific channel as a transport stream type through a Vestigial Sideband (VSB) demodulating operation and an error correcting operation.

A broadcasting signal received through the broadcasting receiver 41 is divided into all kinds of additional data which are defined as an audio signal, a video signal and Program and System Information Protocol (PSIP) information by the de-multiplexer 42, and is outputted as a bit stream type.

Video data divided through the de-multiplexer 42 is processed by the image signal processor 43 and is displayed on the display 44.

At this point, the image signal processor 43 includes an MPEG-2 decoder, and a scaler that converts video data to be suitable for a vertical frequency, a resolution and a screen rate in accordance with the output standard of the display 44.

Herein, the display 44 may use various types of displays such as Digital Light Processing (DLP), Liquid Crystal Display (LCD) and Plasma Display Panel (PDP).

An audio signal is processed by an audio signal processor (not shown) and outputted to a speaker, and the audio signal processor may include an ACA-3 decoder.

Additional data included in additional data that is divided by the de-multiplexer 42 is stored in the storage device 49 through the storage interface 48.

The storage device 49 may be implemented with EEPROM.

The user interface 47 is a means for receiving a request command from a user, and may include an infrared receiver that receives an infrared signal inputted through a remote controller or a local key input unit included in one side of a panel.

The network interface 45 receives contents or data from a content provider or a network operator over a network. That is, the network interface 45 receives contents, which are provided from the content provider over the network, such as broadcasting, games, VOD and broadcasting signals, and relevant information thereof. Also, the network interface 45 receives the updated information of a firmware and an updated file that are provided from the network operator.

The OSD generator 46 generates a menu screen for receiving the user's determination signal as an OSD type.

That is, the OSD generator 46 may display content that is received through the network interface 45 and relevant information thereof, on the display 44.

The external signal input unit 39 is an interface that may receive an input from another player, for example, a DVD player or a game machine. By connecting the other player to the external signal input unit 39, multimedia stored in the player may be outputted on the display 44.

The controller 50 performs an overall control operation based on a command that is inputted from the user interface 47. The controller 50 receives and executes the software (i.e., the updated file of a firmware) of the content provider that is received from the network operator.

According to embodiments, the broadcasting reception apparatus 40 may output a Three-Dimensional (3D) image. The menu screen of the broadcasting reception apparatus 40 may be provided as a 3D screen, and even when content provided by the content provider is 3D content, the broadcasting reception apparatus 40 may receive and output the 3D content.

For realizing a 3D image, as illustrated in FIG. 9, a 3D formatter 38 is disposed in an output terminal of the image signal processor 43. The 3D formatter 38 converts an image processed by the image signal processor 43 into a 3D image and transfers the 3D image to the display 44. According to embodiments, the OSD generator 46 may include a separate 3D formatter that converts an OSD output into a 3D output.

The methods according to embodiments may be implemented as programs executable in general processors such as computers, and particularly, may be implemented with a flash application or a 3D flash application. The implemented programs may be stored in a computer readable recording medium in a network TV. Examples of the computer readable recording medium include read-only memory (ROM), random-access memory (RAM), CD-ROMs, magnetic tapes, floppy disks, optical data storage devices, and carrier waves (such as data transmission through the Internet).

The computer readable recording medium can be distributed over network coupled computer systems so that the computer readable code is stored and executed in a distributed fashion. Also, functional programs, codes, and code segments for accomplishing the present invention can be easily construed by programmers skilled in the art to which the present invention pertains.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling a user interface of a computing device including a controller by using a camera having an infrared image sensor and an infrared illuminator, the method comprising:

detecting, by the controller, at least one predetermined user gesture which is designated to switch a first power mode of the camera to a second power mode, from a first infrared image which is recognized by the infrared image sensor by using a first infrared illumination with a first illumination intensity provided by the infrared illuminator, in the first power mode of the camera;

switching an operation mode of the camera to the second power mode according to the detected at least one predetermined user gesture while controlling an illumination intensity of the infrared illuminator, wherein the infrared illuminator has the first illumination intensity in the first power mode, the infrared illuminator has a second illumination intensity in the second power mode, and the second illumination intensity is higher than the first illumination intensity, and wherein the second power mode allows detection of more user gestures than the first power mode;

detecting, by the controller, one or more different gestures of a user, from a second infrared image which is recognized by the infrared image sensor by using a second infrared illumination with the second illumination intensity provided by the infrared illuminator, in the second power mode of the camera; and controlling the computing device according to the detected one or more different gestures of the user, wherein the first and second power modes are a low power mode and a high power mode, respectively.

2. The method according to claim 1, wherein the switching of the operation mode to the second power mode comprises changing at least one of a frame rate, a clock speed, a resolution and a shutter speed of the camera.

3. The method according to claim 1, wherein the switching of the operation mode to the second power mode comprises increasing a frame rate of the camera.

4. The method according to claim 1, wherein the detecting of the one or more different gestures of the user comprises:
measuring a distance from the user to the computing device when the one or more gestures are detected; and
controlling an illumination intensity of the camera in accordance with the measured distance.

5. The method according to claim 1, wherein the camera is an infrared camera or a depth image camera.

6. The method according to claim 1, wherein the at least one predetermined user gesture includes at least one of shaking the user's hand from side to side, shaking the user's hand upward and downward, and drawing a certain shape by the user's hand.

7. The method according to claim 1, further comprising:
returning the camera to the first power mode when there is no input from the user for a certain time period.

8. The method according to claim 1, further comprising:
operating the camera in the second power mode once a specific application is executed.

9. A computing device for controlling a camera having an infrared image sensor and an infrared illuminator, the computing device comprising:
an interface configured to communicate with the camera; and
a controller configured to:
detect at least one predetermined user gesture which is designated to switch a first power mode of the camera to a second power mode, from a first infrared image which is recognized by the infrared image sensor by using a first infrared illumination with a first illumination intensity provided by the infrared illuminator, in the first power mode of the camera,
switch an operation mode of the camera to the second power mode according to the detected at least one predetermined user gesture while controlling an illumination intensity of the infrared illuminator, wherein the infrared illuminator has the first illumination intensity in the first power mode, the infrared illuminator has a second illumination intensity in the second power mode, and the second illumination intensity is higher than the first illumination intensity, and wherein the second power mode allows detection of more user gestures than the first power mode,
detect one or more different gestures of a user, from a second infrared image which is recognized by the infrared image sensor by using a second infrared illumination with the second illumination intensity provided by the infrared illuminator, in the second power mode of the camera, and
control an operation of the computing device according to the detected one or more different gestures of the user,
wherein the first and second power modes are a low power mode and a high power mode, respectively.

10. The computing device according to claim 9, wherein the controller switches the operation mode to the second power mode by changing at least one of a frame rate, a clock speed, a resolution and a shutter speed of the camera.

11. The computing device according to claim 9, wherein the controller switches the operation mode to the second power mode by increasing a frame rate of the camera.

12. The computing device according to claim 9, wherein the controller detects the one or more different gestures of the user by measuring a distance from the user to the computing device when the one or more gestures are detected and controlling an illumination intensity of the camera in accordance with the measured distance.

13. The computing device according to claim 9, wherein the computing device includes the camera which is an infrared camera or a depth image camera.

14. The computing device according to claim 9, wherein the at least one predetermined user gesture includes at least one of shaking the user's hand from side to side, shaking the user's hand upward and downward, and drawing a certain shape by the user's hand.

15. The computing device according to claim 9, wherein the controller is further configured to return the camera to the first power mode when there is no input from the user for a certain time period.

16. The computing device according to claim 9, wherein the controller is further configured to operate the camera in the second power mode once a specific application is executed.

17. The computing device according to claim 9, wherein the computing device is one of a television (TV), a game machine and a portable phone.

* * * * *